United States Patent [19]
MacGregor et al.

[11] Patent Number: 6,136,441
[45] Date of Patent: Oct. 24, 2000

[54] MULTILAYER PLASTIC ARTICLES

[75] Inventors: Amy K. MacGregor, Gansevoort, N.Y.; Frank A. Hoefflin, Evansville; Cecil E. Ayers, Mt. Vernon, both of Ind.; Donald G. Legrand, Burnt Hills, N.Y.; Gregory R. Gillette, Clifton Park, N.Y.; James E. Pickett, Schenectady, N.Y.; George T. Seeger, Scotia, N.Y.; Kenneth L. Lilly, Evansville, Ind.

[73] Assignee: General Electric Company, Pittsfield, Mass.

[21] Appl. No.: 09/046,878

[22] Filed: Mar. 24, 1998

[51] Int. Cl.[7] ........................ B32B 27/36
[52] U.S. Cl. .................. 428/412; 528/176; 528/196; 528/198
[58] Field of Search .............. 528/176, 196, 528/198; 428/412

[56] References Cited

U.S. PATENT DOCUMENTS

| | | | |
|---|---|---|---|
| 2,465,319 | 3/1949 | Whinfield et al. | 528/176 |
| 2,675,390 | 4/1954 | Rosenblatt | 528/176 |
| 2,888,484 | 5/1959 | Dekm et al. | 528/176 |
| 3,047,539 | 7/1962 | Pengilly | 524/152 |
| 3,444,237 | 5/1969 | Jaffe | 528/176 |
| 4,217,438 | 8/1980 | Brunelle et al. | 528/176 |
| 4,754,064 | 6/1988 | Lillwitz | 562/509 |
| 5,193,913 | 3/1993 | Rosenbaum | 383/113 |
| 5,441,997 | 8/1995 | Walsh et al. | 524/147 |
| 5,589,530 | 12/1996 | Walsh | 528/176 |
| 5,817,722 | 10/1998 | Yezrielev et al. | 525/441 |

FOREIGN PATENT DOCUMENTS

| | | |
|---|---|---|
| 0 320 647 | 6/1989 | European Pat. Off. . |
| 27 30 899 | 2/1979 | Germany . |
| XP002108852 | 9/1990 | Japan . |

OTHER PUBLICATIONS

Modern Plastics, Feb. 1998, p34.
Journal of Organic Chemistry, vol. 31, p3,438, Friefelder et al.

*Primary Examiner*—Terressa M. Boykin

[57] ABSTRACT

Multilayer plastic composite articles comprising a thermoplastic resin substrate which can be a polycarbonate, an ABS or ASA resin, a polyphenylene ether or polyphenylene ether/polystyrene blend, an polyester or an admixture of polycarbonate with ABS, ASA or polyester and at least one surface layer comprising a cyloaliphatic polyester or cycloaliphatic polyester blend which is adherent to at least one surface of the substrate. Decorative layers can be located between the substrate and the surface layers.

31 Claims, No Drawings

MULTILAYER PLASTIC ARTICLES

FIELD OF THE INVENTION

This invention is directed to multilayer plastic articles, their properties and methods for making such articles. More particularly the articles comprise a substrate or base layer of an injection molded, blow molded or extruded thermoplastic and a top and/or bottom layer of acycloaliphatic polyester.

BACKGROUND OF THE INVENTION

There is substantial commercial interest in the use of plastic materials in various product forms such as sheet, film, shaped products, thermoformed articles, packaging, and architectural products. Many different plastics are used for such products in order to take advantage of particular physical, chemical, and mechanical properties.

SUMMARY OF THE INVENTION

Thermoplastic resins are provided with a surface film which improves weatherability, and solvent resistance, and which can be used to modify the color and appearance of the thermoplastic material. The surface film comprises a thin film of a cycloaliphatic polyester which is applied to the thermoplastic substrate by lamination, coextrusion or by an in-mold process known in the art as "in-mold decoration" in which the surface film is placed in the mold and the thermoplastic melt, which forms the substrate or base layer, is injection molded to the exposed surface or surfaces of the film.

The substrate or base layer can be any suitable thermoplastic resin including polycarbonates; polyesters; acrylonitrile-butadiene-styrene resins, referred to as ABS resins; acrylonitrile-styrene-acrylate resins, referred to as ASA resins, a polyphenylene ether or polyphenylene ether/polystyrene blend and blends comprising polycarbonate in a mixture with one or more ABS, ASA or polyester resins In one embodiment of the invention a cycloaliphatic polyester layer can be laminated or adhered to both sides, i.e., top and bottom of the injection molded substrate, thereby making a three layer structure in which the substrate is protected on both sides by the same or different cycloaliphatic polyester layers. Various intermediate layers can be applied for decorative or functional purposes, or the cycloaliphatic polyester resin itself can be colored or modified to be the decorative layer.

The structures of this invention can be transparent, opaque, or non-transparent, or combinations of transparent and opaque layers as desired. Transparent products are a preferred embodiments of this invention. The composite multilayered structure or article can be stabilized by inclusion of ultra violet or infrared absorbing additives.

The invention provides articles comprising a thermoplastic substrate or base, preferably a polycarbonate resin or polycarbonate blend with other resins, and at least one surface layer comprised of a cycloaliphatic polyester or a blend of polycarbonate and cycloaliphatic polyester. The substrate can have a surface layers on both sides. The base and surface layers can be provided with compatible functional additives.

DETAILED DESCRIPTION

Polycarbonates (PC) for use in the production of the multilayered articles of the invention are thermoplastic, aromatic polymers and include homopolycarbonates, copolycarbonates and copolyestercarbonates and mixtures thereof which have average molecular weights of about 8,000 to more than 200,000, preferably of about 20,000 to 80,000 and an intrinsic viscosity (I.V.) of 0.40 to 1.5 dl/g as measured in methylene chloride at 25° C. In one embodiment, the polycarbonates are derived from dihydric phenols, or bisphenols, and carbonate precursors.

Polycarbonates are a well known class of high impact resistant thermoplastic resins characterized by optical clarity and high ductility. One of the most important engineering thermoplastics in use today are the polycarbonates. Polycarbonates can be defined as polymers containing recurring carbonate groups (—O—CO—O—) in the main chain. Aromatic polycarbonates are of particular interest in the practice of this invention. These polymers are known per se and are generally prepared by reacting a dihydric phenol, or bisphenol, with a carbonate precursor, e.g., phosgene, a halogen formate, or a carbonate ester.

Aromatic polycarbonates comprise multiple structural units represented by the formula:

$$[-O-A^1-O-C(O)-] \qquad \text{Formula 1}$$

wherein $A^1$ is a divalent aromatic hydrocarbon radical. Suitable aromatic hydrocarbon radicals for inclusion as $A^1$ include m-phenylene, p-phenylene, 4,4'-biphenylene, 4,4'-bi(3,5-dimethyl)-phenylene, 2,2-bis(4-phenylene)propane and similar radicals such as those which correspond to the dihydroxy-substituted aromatic hydrocarbons disclosed by name or formula in U.S. Pat. 4,217,438.

The $A^1$ radical preferably has the formula:

$$-A^2-Y-A^3- \qquad \text{Formula 2}$$

wherein each of $A^2$ and $A^3$ is a mono cyclic divalent aromatic hydrocarbon radical and Y is a bridging hydrocarbon radical in which one or two atoms separate $A^2$ from $A^3$. The free valence bonds in formula 2 are usually in the meta or para positions of $A^2$ and $A^3$ in relation to Y. Compounds in which $A^1$ has formula 1 are bisphenols, and for the sake of brevity the term "bisphenol" is sometimes used herein to designate the dihydroxy-substituted aromatic hydrocarbons; it should be understood, however, that non-bisphenol compounds of this type may also be employed as appropriate.

In formula 2, the $A^2$ and $A^3$ values may be unsubstituted phenylene or hydrocarbon-substituted derivatives thereof, illustrative substituents (one or more) being alkyl and alkenyl. Unsubstituted phenylene radicals are preferred. Both $A^2$ and $A^3$ are preferably p-phenylene, although both may be o- or m- phenylene or one o- or m-phenylene and the other p-phenylene.

The bridging radical, Y, is one in which one or two atoms, preferably one, separate $A^2$ from $A^3$. Illustrative radicals of this type are methylene, cyclohexylmethylene, 2-[2.2.1]-bicycloheptylmethylene, ethylene, isopropylidene, neopentylidene, cyclohexylidene, cyclopentadecylidene, cyclododecylidene and adamantylidene; gem-alkylene (alkylidene) radicals are preferred. Also included, however, are unsaturated radicals. For reasons of availability and particular suitability for the purposes of this invention, the preferred bisphenol is 2,2-bis(4-hydroxyphenyl)propane ("bisphenol A"), in which Y is isopropylidene and $A^2$ and $A^3$ are each p-phenylene.

Cycloaliphatic polyesters suitable for use in the present invention are those which are characterized by optical transparency, improved weatherablity compared to the substrate alone, chemical resistance, and low water absorption. The cycloaliphatic polyester layers also have good melt compatibility with the substrate resins allowing easy recycling of the multilayer structures by simply re-melting the multilayer article and reforming one of the layers as a combination of the substrate layer and the cycloaliphatic cap layer. Other cap layers, for instance chlorinated polyolefins may react on re-melting causing degradation of the substrate resin particularly if the substrate resin is a high melting condensation polymer like polycarbonate. This compatibility of the cap layer and the substrate of the multilayered articles of this invention allows recycling of scrap during manufacture or simple recovery of the resins after the useful lifetime of the article. This is especially beneficial in articles containing polycarbonate or polycarbonate blends.

Cycloaliphatic polyesters useful in the practice of the invention are prepared by reaction of a diol with a dibasic acid or derivative.

The diols useful in the preparation of the cycloaliphatic polyester resins for use as the surface films of the present invention are straight chain, branched, or cycloaliphatic, preferably straight chain or branched alkane diols, and may contain from 2 to 12 carbon atoms. Examples include, but are not limited to, ethylene glycol, propylene glycol, i.e., 1,2- and 1,3-propylene glycol, butane diol, i.e., 1,3- and 1,4-butane diol, diethylene glycol, 2,2-dimethyl-1,3-propane diol, 2-ethyl, 2-methyl, 1,3-propane diol, 1,3- and 1,5-pentane diol, dipropylene glycol, 2-methyl-1,5-pentane diol, 1,6-hexane diol, 1,4-cyclohexane dimethanol and particularly its cis- and trans-isomers, triethylene glycol, 1,10-decane diol, and mixtures of any of the foregoing. Particularly preferred is dimethanol bicyclo octane, dimethanol decalin, a cycloaliphatic diol or chemical equivalent thereof and particularly 1,4-cyclohexane dimethanol or its chemical equivalents are to be used as the diol component, it is preferred that a mixture of cis- to trans-isomer thereof, ranging from 1:4 to 4:1, and preferably, a ratio of about 1:3 is used. Chemical equivalents to the diols include esters, such as dialkylesters, diaryl esters, and the like.

The diacids useful in the preparation of the cycloaliphatic polyester resins of the present invention are aliphatic diacids. This is meant to include carboxylic acids having two carboxyl groups each of which is attached to a saturated carbon in a saturated ring. A preferred diacid is 1,4-cyclohexanedicarboxylic acid and most preferred is trans-1,4-cyclohexanedicarboxylic acid as further explained above. Other cycloaliphatic acids include decahydro naphthalene dicarboxylic acid, norbornene dicarboxylic acids, bicyclo octane dicarboxylic acids. Linear aliphatic diacids are also useful provided the polyester has at least one monomer containing a cycloaliphatic ring. Illustrative examples of linear aliphatic diacids are succinic acid, adipic acid, dimethyl succinic acid, and azelaic acid.

Mixtures of diacid and diols may also be used to make the cycloaliphatic polyesters of the invention.

Cyclohexanedicarboxylic acids and their chemical equivalents can be prepared, for example, by the hydrogenation of cycloaromatic diacids and corresponding derivatives such as isophthalic acid, terephthalic acid of naphthalenic acid in a suitable solvent, water or acetic acid at room temperature and at atmospheric pressure using suitable catalysts such as rhodium supported on a suitable carrier of carbon or alumina. See, Friefelder et al., =Journal of Organic Chemistry, 31, 34–38 (1966); U.S. Pat. Nos. 2,675,390 and 4,754,064. They may also be prepared by the use of an inert liquid medium in which a acid is at least partially soluble under reaction conditions and a catalyst of palladium or ruthenium in carbon or silica. See, U.S. Pat. Nos. 2,888,484 and 3,444,237.

Typically, during hydrogenation, two or more isomers are obtained in which the carboxylic acid groups are in cis- or trans-positions. The cis- and trans-isomers can be separated by crystallization with or without a solvent, for example, n-heptane, or by distillation. The cis-isomer tends to blend better; however, the trans-isomer has higher melting and crystallization temperatures and is especially preferred. Mixtures of the cis- and trans-isomers are useful herein as well, and preferably when such a mixture is used, the trans-isomer will comprise at least about 75 parts by weight and the cis-isomer will comprise the remainder based upon 100 parts by weight of cis- and trans-isomers combined. When a mixture of isomers or more than one diacid is used, a copolyester or a mixture of two polyesters may be used as the cycloaliphatic polyester resin in the present invention.

Chemical equivalents of these diacids include esters, alkyl esters, e.g., dialkyl esters, diaryl esters, anhydrides, acid chlorides, acid bromides, and the like. The preferred chemical equivalents comprise the dialkyl esters of the cycloaliphatic diacids, and the most preferred chemical equivalent comprise the dimethyl ester of the acid, particularly dimethyl-trans-1,4-cyclohexanedicarboxylate.

Dimethyl-1,4-cyclohexanedicarboxylate can be obtained by ring hydrogenation of dimethylterephthalate, and two isomers having the carboxylic acid groups in the cis- and trans-positions are obtained. The isomers can be separated, the trans-isomer being especially preferred. Mixtures of the isomers are suitable as explained above and preferably in the ratios as explained above.

The polyester resins of the present invention are typically obtained through the condensation or ester interchange polymerization of the diol or diol equivalent component with the diacid or diacid chemical equivalent component -and having recurring units of the Formula 3:

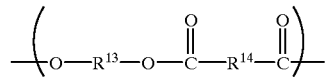

Formula 3 wherein $R^{13}$ represents an alkyl or cycloalkyl radical containing 2 to 12 carbon atoms and which is the residue of a straight chain, branched, or cycloaliphatic alkane diol having 2 to 12 carbon atoms or chemical equivalents thereof; and $R^{14}$ is an alkyl or a cycloaliphatic radical which is the decarboxylated residue derived from a diacid, with the proviso that at least one of $R^{13}$ or $R^{14}$ is a cycloalkyl group.

A preferred cycloaliphatic polyester is poly(1,4-cyclohexane-dimethanol-1,4-cyclohexanedicarboxylate) (PCCD) having recurring units of formula 4:

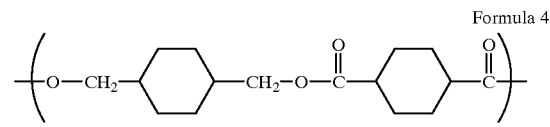

Formula 4 wherein $R^{13}$ is a cyclohexane ring, and wherein $R^{14}$ is a cyclohexane ring derived from cyclohexanedicarboxylate or a chemical equivalent thereof and is selected from the cis- or trans-isomer or a mixture of cis- and trans-isomers thereof.

Cycloaliphatic polyester resins of the instant invention can be generally made following the teachings of, for example, U.S. Pat. 2,465,319. The reaction is generally run in the presence of a suitable catalyst such as a tetra(2-ethyl hexyl)titanate, in a suitable amount, typically about 50 to 400 ppm of titanium based upon the final product.

Poly(1,4-cyclohexanedimethanol-1,4-cyclohexanedicarboxylate), herein abbreviated as PCCD, film shows excellent adhesion to polycarbonate resin substrates, including polycarbonate blends with other thermoplastics, without using a primer. BPA polycarbonates are preferred substrate resins for use in this invention. Films comprising blends of PCCD and polycarbonates also be used as the cap layers of this invention. They exhibit excellent primerless adhesion to a polycarbonate substrate when the film is bonded to the polycarbonate by lamination, hot pressing, in mold decoration, melt extrusion of the polycarbonate on to a PCCD film, coextrusion of both resins, or any similar bonding or joining technique known to those in the art. An In mold decoration process is described in "Modern Plastics" February 1998, p34.

The cap layer of the invention may also comprise a blend of polycarbonate resin with cycloaliphatic polyester resin. Addition of the PC resin to the cycloaliphatic polyester allows retention of clarity and increases the heat distortion temperature (HDT) of the cap layer allowing it be used in a wider range of articles. PC addition to the cycloaliphatic cap layer resin may also beneficially alter its melt strength and crystallization behavior. A preferred embodiment provides a blend of cycloaliphatic polyester resin, and cycloaliphatic polyesters with increased stiffness containing rigid segments such as adamantane, neopentyl or norbornene segments.

A preferred embodiment provides a composition wherein the polycarbonate is bisphenol-A polycarbonate, the cycloaliphatic polyester resin is derived from a cycloaliphatic diol and a cycloaliphatic diacid. The preferred cycloaliphatic resin being poly (1,4-cyclohexanedimethanol-1,4-cyclohexanedicarboxylate) (PCCD), and further, wherein the ratio of the polycarbonate to PCCD is from about 60:40 to about 75:25.

Blends of polymers such as polycarbonate and cycloaliphatic polyesters generally contain catalyst quenchers. Catalyst quenchers are agents which inhibit activity of any catalysts which may be present in the resins. Catalyst quenchers are described in detail in U.S. Pat. 5,441,997. It is critical to chose the correct quencher to avoid color formation and loss of clarity in the cap layer when it consists of a cycloaliphatic polyester blended with PC resin.

A preferred class of quenchers are those which provide a transparent and colorless product. Typically, such stabilizers are used at a level of 0.001–10 weight percent and preferably at a level of from 0.005–2 weight percent. The preferred stabilizers include an effective amount of an acidic phosphate salt; an acid, alkyl, aryl or mixed phosphite having at least one acidic hydrogen; a Group IB or Group IIB metal phosphate salt; a phosphorus oxo acid, a metal acid pyrophosphate or a mixture thereof. The suitability of a particular compound for use as a stabilizer and the determination of how much is to be used as a stabilizer may be readily determined by preparing a mixture of the polyester resin component, and polycarbonate resin with and without the particular compound and determining the effect on melt viscosity, gas generation, color or the formation of interpolymer. The acidic phosphate salts include sodium dihydrogen phosphate, mono zinc phosphate, potassium hydrogen phosphate, calcium dihydrogen phosphate and the like. The phosphites may be of the formula:

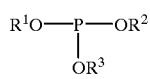

where $R^1$, $R^2$ and $R^3$ are independently selected from the group consisting of hydrogen, alkyl and aryl with the proviso that at least one of $R^1$, $R^2$ and $R^3$ is hydrogen.

The phosphate salts of a Group IB or Group IIB metals of the periodic table include zinc phosphate, copper phosphate and the like. The phosphorus oxo acids include phosphorous acid, phosphoric acid, polyphosphoric acid or hypophosphorous acid.

The polyacid pyrophosphates may be of the formula:

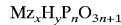

wherein M is a metal, x is a number ranging from 1 to 12 and y is a number ranging 1 to 12, n is a number from 2 to 10, z is a number from 1 to 5 and the sum of (xz)+y is equal to n+2. The preferred M is an alkaline or alkaline earth metal.

The most preferred quenchers are oxo acids of phosphorous or acidic organo phosphorus compounds. Inorganic acidic phosphorus compounds may also be used as quenchers, however they may result in haze or loss of clarity. Most preferred quenchers are phosphoric or phosphorous acid.

Cycloaliphatic polyester resins have been found to have better weatherability than polycarbonate alone. Ultraviolet light absorbers are used to improve the polycarbonate light stability. Inclusion of a light stabilizer in a cycloaliphatic polyester layer on the polycarbonate surface has been found to provide additional light stability for the polycarbonate resin.

The ultraviolet light absorbers (UVA) useful in the present invention are those which are generally compatible with polycarbonates. Preferred are benzotriazole, benzophenone, triazine, cyanoacrylate, dibenzoylresorcinol, and oxanilide based UVA Incorporation of a light stabilizing additive in the PCCD composition, i.e., cycloaliphatic polyester alone or a polycarbonate-cycloaliphatic polyester blend, provides additional benefits in weatherability.

In addition to UV absorbers, hindered amine light stabilizers (HALS) also contribute to increased weatherability of the structure.

Illustrative ultraviolet radiation absorbing compounds include 2-(benzotriazol-2-yl)-4-(1,1,3,3-tetramethylbutyl) phenol, 2-(benzotriazol-2-yl)-4-methylphenol, 2-hydroxy-4-octyloxy benzophenone, 2-hydroxy-4-methoxybenzophenone, ethyl-2,2-diphenyl-1-cyanoacrylate, 2'-ethylhexyl-2, 2-diphenyl-1-cyanoacrylate, 2-(2'-hydroxy-4'-octyloxy) bis-4,6-(2', 4'-dimethylphenyl) triazine, 2-ethyl- 2'- ethoxy oxalanide, bis [2-hydroxy-5-methyl-3-(benzotriazol-2-yl) phenyl ] - methane, bis[ 2- hydroxy- 5-t - octyl -3- (benzotriazol -2-yl) phenyl] methane, 2,2'- ( 1,4- phenylene ) bis [ 4 H - 3,1-benzoxazin -4- one], and 2- ( 2'- hydroxy-4-hexyloxy) - 4,6- diphenyl-triazine. Light stabilizers are incorporated in the cycloaliphatic polyester e.g., PCCD, resin in amounts of about 0.05 to about 10 weight percent.

Blends comprising polycarbonate and cycloaliphatic polyester components form one class of resin compositions which can be used to form the multilayer articles of this invention. Such blends generally contain various additives such as colorants, light stabilizers, ultraviolet absorbers, and the like, in addition to quenchers. In preferred examples, the polycarbonate and the cycloaliphatic polyester resin, taken together, comprise (a) from about 70% to about 99.94% by weight of the total composition, the ratio of the polycarbonate to the cycloaliphatic polyester resin being from about 50:50 to about 90:10; (b) the benzotriazole, benzophenone, triazine, cyanoacrylate, dibenzoylresorcinol, and oxanilide based UV absorber comprises from about 0.05% to about 10% by weight of the total composition; and (c) the catalyst quencher comprises from about 0.001% to about 3% by weight of the total composition.

Other preferred embodiments of the instant invention provide a composition wherein the benzotriazole, benzophenone, triazine, cyanoacrylate, dibenzoylresorcinol, and oxanilide based UVA comprises from about 0.3% to about 10% by weight of the total composition of the film layer. Another preferred embodiment provides a composition wherein the benzotriazole, benzophenone, triazine, cyanoacrylate, dibenzoylresorcinol, and oxanilide based UVA comprises from about 0.3% to about 1% by weight of the total composition. Hindered amine light stabilizers, which are well known in the art, may optionally be added at 0.01 to about 1% of the total composition.

In another embodiment of the invention the support layer or substrate comprises an ABS type polymer or an ABS -PC blend. In general, ABS type polymers contain two or more polymeric parts of different compositions which are bonded chemically. The polymer is preferably prepared by polymerizing a conjugated diene, such as butadiene or a conjugated diene with a monomer copolymerizable therewith, such as styrene, to provide a polymeric backbone. After formation of the backbone, at least one grafting monomer, and preferably two, are polymerized in the presence of the prepolymerized backbone to obtain the graft polymer. These resins are prepared by methods well known in the art.

Related ASA resins (Acrylonitrile-Styrene-Acrylate ) are made in a similar fashion in some cases by grafting acrylonitrile, styrene and an optionally an alkyl acrylate to an acrylic rubber. ASA may also be blended with polycarbonate to form a substrate resin.

In ABS the backbone polymer, as mentioned, is preferably a conjugated diene polymer such as polybutadiene, polyisoprene, or a copolymer, such as butadiene-styrene, butadiene-acrylonitrile, or the like. Examples of dienes that may be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, chloro and bromo substituted butadienes such as dichlorobutadiene, bromobutadiene, dibromobutadiene, mixtures thereof, and the like. A preferred conjugated diene is butadiene.

One monomer or group of monomers that may be polymerized in the presence of the prepolymerized backbone are monovinylaromatic hydrocarbons. Examples of the monovinylaromatic compounds and alkyl-, cycloalkyl-, aryl-, alkaryl-, aralkyl-, alkoxy-, aryloxy-, and other substituted vinylaromatic compounds include styrene, 3-methylstyrene; 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetra-chlorostyrene, mixtures thereof, and the like. The preferred monovinylaromatic hydrocarbons used are styrene and alpha -methylstyrene.

A second group of monomers that may be polymerized in the presence of the prepolymerized backbone are acrylic monomers such as acrylonitrile, substituted acrylonitrile and/or acrylic acid esters, exemplified by acrylonitrile, and alkyl acrylates such as methyl methacrylate. Examples of such monomers include acrylonitrile, ethacrylonitrile, methacrylonitrile, alpha -chloroacrylonitrile, beta -chloroacrylonitrile, alpha -bromoacrylonitrile, and beta-bromoacrylonitrile, methyl acrylate, methyl methacrylate, ethyl acrylate, butyl acrylate, propyl acrylate, isopropyl acrylate, and mixtures thereof. The preferred acrylic monomer is acrylonitrile and the preferred acrylic acid esters are ethyl acrylate and methyl methacrylate.

In the preparation of the graft polymer, the conjugated diolefin polymer or copolymer exemplified by a 1,3-butadiene polymer or copolymer comprises about 50% by weight of the total graft polymer composition. The monomers polymerized in the presence of the backbone, exemplified by styrene and acrylonitrile, comprise from about 40 to about 95% by weight of the total graft polymer composition.

The second group of grafting monomers, exemplified by acrylonitrile, ethyl acrylate or methyl methacrylate, of the graft polymer composition, preferably comprise from about 10% to about 40% by weight of the total graft copolymer composition. The monovinylaromatic hydrocarbon exemplified by styrene comprise from about 30 to about 70% by weight of the total graft polymer composition.

In preparing the polymer, it is normal to have a certain percentage of the polymerizing monomers that are grafted on the backbone combine with each other and occur as free copolymer. If styrene is utilized as one of the grafting monomers and acrylonitrile as the second grafting monomer, a certain portion of the composition will copolymerize as free styrene-acrylonitrile copolymer. In the case where alpha -methylstyrene (or other monomer) is substituted for the styrene in the composition used in preparing the graft polymer, a certain percentage of the composition may be an alpha -methylstyrene-acrylonitrile copolymer. Also, there are occasions where a copolymer, such as alpha -methylstyrene-acrylonitrile, is added to the graft polymer copolymer blend. When the graft as polymer-copolymer blend is referred to herein, it is meant optionally to include at least one copolymer blended with the graft polymer composition and which may contain up to 90% of free copolymer.

Optionally, the elastomeric backbone may be an acrylate rubber, such as one based on n-butyl acrylate, ethylacrylate, 2-ethylhexylacrylate, and the like. additionally, minor amounts of a diene may be copolymerized in the acrylate rubber backbone to yield improved grafting with the matrix polymer.

The preferred ABS material for the support layer is Cycolac® resin available from the GE Plastics component of General Electric Company.

Additional material for the support layer include polycarbonate and ABS blends. The polycarbonate and ABS, respectively, are as before described with Lexan® resin and Cycolac® resin being available from GE Plastics component of General Electric Company. The ABS/polycarbonate resin is also available from GE Plastics as Cycoloy® resin. Suitable blends contain about 15 to about 85 weight percent polycarbonate and about 15 to about 85 weight percent ABS resin.

Other preferred substrate layers are polyester components include crystalline polyesters such as polyesters derived from aliphatic or cycloaliphatic diols, or mixtures thereof, containing from 2 to about 12 carbon atoms and at least one aromatic dicarboxylic acid. Preferred polyesters are derived from an aliphatic diol and an aromatic dicarboxylic acid having repeating units of the following general formula:

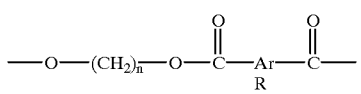

wherein n is an integer of from 2 to 6. Ar is a $C_6$–$C_{20}$ aryl radical comprising a decarboxylated residue derived from an aromatic dicarboxylic acid.

Examples of aromatic dicarboxylic acids represented by the decarboxylated residue Ar are isophthalic or terephthalic acid, 1,2-di(p-carboxyphenyl)ethane, 4,4'-dicarboxydiplhenyl ether, 4,4' bisbenzoic acid and mixtures thereof. All of these acids contain at least one aromatic nucleus. Acids containing fused rings can also be present, such as in 1,4- 1,5- or 2,6- naphthalene dicarboxylic acids. The preferred dicarboxylic acids are terephthalic acid, isophthalic acid, naphthalene dicarboxylic acid or mixtures thereof.

The most preferred polyesters are poly(ethylene terephthalate) (PET), and poly(butylene terephthalate) (PBT), poly(ethylene naphthanoate) (PEN), poly(butylene naphthanoate) (PBN), poly(propylene terephthalate) (PPT), or mixtures of these resins.

Also contemplated herein are the above polyesters with minor amounts, e.g., from about 0.5 to about 15 percent by weight, of units derived from aliphatic acids and/or aliphatic polyols to form copolyesters. The aliphatic polyols include glycols, such as poly(ethylene glycol) or poly(butylene glycol). Such polyesters can be made following the teachings of, for example, U.S. Pat. Nos. 2,465,319 and 3,047,539.

The preferred poly(1,4-butylene terephthalate) resin used in this invention is one obtained by polymerizing a glycol component at least 70 mol %, preferably at least 80 mol %, of which consists of tetramethylene glycol and an acid component at least 70 mol %, preferably at least 80 mol %, of which consists of terephthalic acid, and polyester-forming derivatives therefore.

The polyesters used herein have an intrinsic viscosity of from about 0.4 to about 2.0 dl/ gm. measured in a 60:40 phenol/ tetrachloroethane mixture or similar solvent at 23–30° C. VALOX ®315 polyester is particularly suitable for this invention. Preferably intrinsic viscosity is about 1.1 to about 1.4 dl/gm.

Blends of polyesters may also be employed in the composition. Preferred polyesters blends contain poly(ethylene terephthalate) and poly(1,4-butylene terephthalate). When blends of these preferred components are employed the polyester resin component can comprise from about 5 to about 50 parts by weight poly(ethylene terephthalate) and from about 95 to about 50 part by weight poly(1,4-butylene terephthalate) based on 100 parts by weight of both components combined.

Also, blends of relatively low molecular weight polybutylene terephthalate resin may be used with a relatively high molecular weight polybutylene terephthalate as set forth in U.S. Pat. 5,589,530 to Walsh. The low molecular weight polybutylene terephthalate is a PBT resin having a melt viscosity of less than 600 poise at 250° C.

The aromatic polyesters are the reaction products of aliphatic diols and aromatic dicarboxylic acids, or their derivatives. Preferred diols are C2–C12 diols; especially preferred are ethylene glycol, propylene glycol and butylene glycol. Preferred dicarboxylic acid are derived from benzene or naphthalene rings. Most preferred diacids are iso and tere phthalic acid or naphthalene dicarboxylic acid, especially the 2, 6 naphthalene dicarboxylate.

Blends of polycarbonate with polyesters are also preferred substrates. As indicated earlier, the preferred polycarbonate is bisphenol-A polycarbonate. When blends of these preferred components are employed the polyester resin component can comprise from about 1 to about 99 parts by weight polyester and from about 99 to about 1 part by weight polycarbonate based on 100 parts by weight of both components combined.

These materials especially when further blended with rubbery impact modifiers provide resins with excellent impact and stiffness. The preferred polycarbonate resins are as described previously with BPA-PC being most preferred.

Impact modifiers especially suitable for optional inclusion in the aromatic polyester polycarbonate blends are core shell modifiers such and MBS (methacrylate-butadiene-styrene) copolymers and methylmethacrylate-butyl acrylate (acrylic rubber) core shell rubbers as well as acrylonitrile styrene graft polybutadiene rubbers (ABS rubber).

Thermoplastic resins comprising a blend of polycarbonate and polyesters resin are available from General Electric Company Plastics Division under the trademark Xenoy®.

Articles of the invention may also use polyphenylene ether and polyphenylene ether/polystyrene blends as the substrate. The polyphenylene either resins can be homopolymers or copolymers and are preferably derived from the polymerization of alkyl or aryl substituted phenols, 2,6 xylenol and 2,3,6 trimethyl phenol are especially preferred. The polystyrene resins used in blends with the polyphenylene ethers can be alkyl, aryl or halogen substituted. They may further be modified with rubber especially butadiene based rubber. Most preferred are polystyrene, alpha-methyl polystyrene, para-methyl polystyrene and high impact modified polystyrene known as HIPS. Polyphenylene ether polystyrene blends are sold by GE Plastics under the Noryl® trade name.

The composite article comprising a base or substrate of a thermoplastic resin such as a polycarbonate, polyester, or an ABS resin or a polycarbonate resin blend and an adherent layer of cycloaliphatic polyester film is preferably, optically transparent and has improved weather resistance when compared to the substrate, e.g., polycarbonate, surface alone. In addition to a transparency of greater than 87%, the polycarbonate cycloaliphatic polyester composite is characterized by other properties such as good impact strength, low water absorption, chemical resistance to methanol, ethyl acetate, and MEK, low shrinkage, good processability, printability, and cutability.

The substrate resin may also contain other additives such as colorants, flame retardant chemicals, glass fibers, mineral fillers such as talc, clay, barium sulfate, mica, glass spheres as well as thermal stabilizers , lubricants and other processing aids.

In a preferred method for forming the multilayer articles of this invention a surface layer is formed by coextruding polycarbonate and cycloaliphatic as a composite film. The substrate is then injected onto the polycarbonate side of the composite during a subsequent molding operation. The resulting multilayer article comprises a substrate (in this case PC), an intermediate film of the same material as the substrate, e.g., polycarbonate, and a top layer of a cycloaliphatic polyester, such as PCCD. The composite film can be any suitable and convenient thickness. For example the polycarbonate film can be about 10 mils thick and the PCCD film can be about 5 mils thick, the substrate can be thicker. Any ink or decorative layer can be printed on the surface of the laminated polycarbonate or cycloaliphatic polyester film.

The articles of the invention can be formed by various processes: for instance; compression molding, multilayer blow molding, coextrusion of sheet or film, injection over molding, insertion blow molding and other methods.

The multilayer articles of the invention can have a variety of uses in business equipment, hand held communication devices, pagers, telephones, automobiles in applications such as body panels, interior and exterior trim and bumpers. The articles can also be used, glazing, membrane switches, packaging, building and construction.

The following examples are presented to illustrate the invention and should not be construed to limit the scope of the invention.

Example 1.

A blend of 60% PCCD and 40% PC film 13–15 mil thick was prepared with 0.05% [45%] aqueous phosphorous acid. The extrusion conditions are listed in Table 1.

TABLE 1

Example of Extrusion Conditions for PC/PCCD Blend

| | |
|---|---|
| Extruder Diameter | 2 in. |
| Drying Temperature (° F.) | 200 |
| Drying Time (Hours) | 6 |
| Moisture Content (%) | <0.020 |
| Extruder Temperatures (° F.) | Set/Actual |
| Zone 1 | 440/441 |
| Zone 2 | 460/462 |
| Zone 3 | 470/473 |
| Zone 4 | 485/486 |
| Zone 5 | 485/486 |
| Pipes and Clamps Temperature (° F.) | 480/477 |
| Melt Temperature (° F.) | 487 |
| Pressure (psi) | 1450 |
| Screw RPM | 30 |
| Extruder Amps | 18 |
| Line Speed (fps) | 8.1 |
| Die Lips (° F.) | 480 |
| Roll Stack Temp (° F.) | 170/171 |
| Feed Block Adapter Temperature (° F.) | 480/481 |

The resulting 13–15 mil film was optically transparent with good appearance.

Example 2:

A 10 mil optically transparent 100% PCCD film was also prepared. Prior to extrusion the PCCD resin was dried at 200° F. for 4–5 hours. The dry resin was then put into a 1.25" diameter single stage screw extruder with barrel settings set between 425° F. and 450° F. The L/D ratio was 24 and the screw had a compression ratio of 3.5, the screw speed was 55 RPMs and power was at 27 amps on a line moving at a rate of 7.2 fpm. Short residence times were desirable to avoid thermal degradation. The resulting film was optically transparent.

In Mold Decorating:

The PCCD film sample from the prior example was treated with Teflon tape on both sides for the first one inch along the width of a 4"×6" film. The film was then placed into the mold of an injection molding machine. Lexan 140 grade polycarbonate resin was then injected into the mold to form a layered composite of PC resin and PCCD film. The experimental conditions for the Nissei 160 ton press injection molder are shown in Table 2.

TABLE 2

Experimental Conditions for In Mold Decorating PCCD Film Injection Molding Conditions:

| | |
|---|---|
| Barrel set Temps: | |
| Nozzle | 585° F. |
| Front | 585° F. |
| Middle | 585° F. |
| Rear | 525° F. |
| Tool set Temps: | Moveable 175° F./Fixed 175° F. |
| Times: | |
| Inject | 10 sec. |
| Cool | 22 sec. |
| Cycle | 1 sec. |
| Injection Velocity | ~4.5 in./sec (ram) (75%) |
| Hold Pressure | 30% Mach. Cap. (625 psi) |
| Velocity to Pressure | |
| Switch Point | 10 mm |
| Shot Size | 42 mm |
| Cushion | 9 mm |
| Screw Speed | 80 rpm |
| Screw decompression | 1 mm |
| Screw Back Pressure | 0 |

Adhesion Testing:

Once the layered structure was made the adhesion could be tested. A one inch wide adhesion test sample was cut from the plaque and mounted in a screw driven model 6025 Instron running Acquilin software. The Teflon PTFE flap provided a flap which could be easily grasped by the Instron which was used to perform 90 degree peel tests. The rate of peel was 0.0067 in/sec.

The adhesion test showed that the PCCD to PC adhesion was greater than 22 lb./in., before the film failed by breaking. In addition, upon viewing the film under magnification a clean interface is observed which would indicate low distortion upon printing and thermoforming.

Tear Strength:

The tear strength of a 10 mil 100% PCCD film was tested along with a PC film and a PC/ PCCD blend all of the same thickness. It was found that the PCCD film showed a better tear strength of 69 g/mil than did PC film which had a tear strength of 42 g/mil. A blend of 90% PC and 10% PCCD film was also tested and found to have an intermediate tear strength of 48 g/mil. A 15 mil multilayer article of PCCD coextruded over PC also showed good tear resistance in practical tests.

Heat Deflection Temperature (HDT)

Since PCCD has a low heat deflection temperature of 125° F. for a 10 mil film, it is shown that it can be blended with higher heat resistant materials to improve its HDT. Table 3. Shows PCCD being blended with polycarbonate resin to reach heat deflection temperatures of 250° F. with only 50 weight percent polycarbonate.

TABLE 3

The HDT of PCCD Can be Improved with Small Amounts of PC Resin.

| Run # | PCCD (wt %) | PC (wt %) | HDT (° F.) |
|---|---|---|---|
| 1 | 100 | 0 | 125 |
| 2 | 0 | 100 | 250 |
| 3 | 90 | 10 | 150 |
| 4 | 70 | 30 | 180 |
| 5 | 50 | 50 | 250 |

Oxygen ($TO_2$%) Barrier Performance:

The amount of PCCD in the PCCD/PC blend formulation can be used to control the rate of oxygen transmittance through the film, while maintaining overall clarity and chemical resistance. Table 4. Shows the relative performance of PC film, PCCD film and a 90/10 PC/PCCD film to oxygen transmittance rates.

TABLE 4

Oxygen Transmittance Rates of PCCD, PC and Blend Films

| Film material | $TO_2$ (73 F.) cc $O_2$ * mil/100 in$^2$/day |
|---|---|
| PC | 219 |
| PCCD | 147 |
| 90/10 PC/PCCD | 145 |

Example 3:
Ink Adhesion / Diecutability

A 60 PCCD/ 40 PC blend film was screen printed with a black ink made by Nazdar Company (Black, 9624). No adhesion promoters or treatments were used. The print adhesion was then tested by a crosshatch adhesion test (ASTM D3559) and was found to have a 5B rating.

The diecutting process involves stamping out the film into the shape of the mold. Failure is marked by hairline cracks along the edges or slivers of polymer along the cut surface, often referred to as 'angel hair' by those skilled in the art. The film printed and cut according to acceptable standards.

Example 4.

An ABS resin (Cycolac® GPM5500) and an ABS/PC (Cycoloy® C6200) blend made by the General Electric Company was used to in mold decorate a 60 % PCCD with 40% 130 grade PC blend film (60/40 PCCD/PC). The 60/40 PCCD/PC film was thermoformed and diecut to fit within a three dimensional mold. In mold decorated samples were prepared with each the Cycolac GPM5500 and the Cycoloy C6200 resins. The resulting parts were laminated parts containing the 60/40 PCCD/PC film on one side. The final parts had an acceptable aesthetic appearance. The conditions for in mold decorating the film are shown in table 5, below.

TABLE 5

In Mold Decorating Conditions for Cycolac ABS and Cycoloy ABS/PC Resins

|  | Cycolac GPM 5500 | Cycoloy C6200 |
|---|---|---|
| Barrel set Temps: |  |  |
| Nozzle | 465° F. | 585° F. |
| Front | 455° F. | 585° F. |
| Middle | 450° F. | 585° F. |
| Rear | 440° F. | 525° F. |
| Tool set Temps: |  | Moveable 175° F. Fixed 175° F. |
| Times: |  |  |
| First Injection | 2.81 sec | 2.85 sec. |
| Second Injection | 1.02 sec. | 1.02 sec. |
| Cure | 16 sec | 16 sec. |
| Mold Open | 4 sec | 4 sec. |
| Total Cycle | 41 sec | 41 sec. |
| Injection Velocity | 1.2 in./sec | 1.2 in./sec |
| Pressure, psi |  |  |
| First Injection | 1700 | 2000 |
| Second Injection | 200 | 200 |
| Back | 75 | 75 |
| Clamp | 200 | 200 |

TABLE 5-continued

In Mold Decorating Conditions for Cycolac ABS and Cycoloy ABS/PC Resins

|  | Cycolac GPM 5500 | Cycoloy C6200 |
|---|---|---|
| Shot Size |  | 1.65 1.80 |
| Extruder Rate | 150 rpm | 150 rpm |

The samples were tested to determine the adhesion between the base resin and the film using a one-inch strip cut from the laminate and an Instron. A 90 degree adhesion peel test showed that the Cycolac GPM 5500 resin with the 60/40 PCCD/PC film had an average adhesion of 1.2 lb/in while the Cycoloy C6200 had an average adhesion of 11.2 lb/in.

Example 5.

A 50% Polycarbonate (PC)/50% PCCD film blend and a 100% PCCD film both containing benzotriazole stabilizer, Cyasorb UV 5411® as a UV light absorber (UVA) were prepared. The UVA was thoroughly mixed into the resin pellet with 0.05% phosphorous acid quencher and extruded under the conditions listed in table 6.

TABLE 6

Composition and Extrusion Conditions for Making PCCD Film and 50/50 PC/PCCD Film

| Resin Composition PCCD Film: |  |  |
|---|---|---|
| PCCD (pellets) | 99.0 pbw | 2247.3 g |
| Cyasorb 5411. | 1.00 pbw | 22.7 g |
| Phosphorous acid | 0.05 pbw | 1.14 g |
| Extruder conditions PCCD Film: |  |  |
| Resin dried at 90 C. >4 hr. |  |  |
| Temperature sets: |  |  |
| Rear | 400 F. |  |
| Middle | 440 F. |  |
| Front | 440 F. |  |
| Nozzle | 450 F. |  |
| Melt-Temp. | 446 F. |  |
| Other Conditions: |  |  |
| Motor amps | ~3.0 |  |
| Roll stack | 145 F. |  |
| RPM's | 75 |  |
| Feeder speed | 5.0 |  |
| Roll speed | 5.0 |  |
| Die press. | 0–500 psi |  |
| Sheet Die | 450 F. |  |
| Film thickness | ~0.005" |  |
| Resin Composition PC/PCCD Film: |  |  |
| PC-135 (pellets) | 49.48 pbw | 1123.1 g |
| PCCD (pellets) | 49.48 pbw | 1123.1 g |
| Cyasorb 5411 | 1.00 pbw | 22.7 g |
| Phosphorous acid | 0.05 pbw | 1.14 g |
| Extruder conditions: |  |  |
| Resin dried at 100 C. >4 hr. |  |  |
| Temperature sets: |  |  |
| Rear | 450 F. |  |
| Middle | 470 F. |  |
| Front | 470 F. |  |
| Nozzle | 500 F. |  |
| Melt-Temp. | 496 F. |  |
| Other Conditions: |  |  |
| Motor amps | ~3.0 |  |
| Roll stack | 175 F. |  |
| RPM's | 75 |  |

TABLE 6-continued

Composition and Extrusion Conditions for Making PCCD Film and 50/50 PC/PCCD Film

| | |
|---|---|
| Feeder speed | 3.0 |
| Roll speed | 5.0 |
| Die press. | 0–500 psi |
| Sheet Die | 470 F. |
| Film thickness | ~0.005" |

After the films were prepared the thickness, transmittance, YI, and haze were measured The results are shown in the table below. The transmittance, YI and haze were measure using a Gardner Colorimeter in the transmittance mode.

TABLE 7

Film Thickness, Transmittance, YI and Haze of the PCCD and 50/50 PC/PCCD films prepared.

| | Transmittance | YI | % Haze | Thickness (mil) |
|---|---|---|---|---|
| PCCD Film | 92.1 | 3.1 | 0.8 | 8.8 |
| PC/PCCD Film | 91.4 | 2.0 | 6.2 | 8.3 |

These film samples were then in mold decorated with Lexan® 125 Resin (PC), Xenoy® 1102 Resin (46/40/14 PC/Polybutylene terephthalate/MBS blend, Noryl PX1005® resin (a polystyrene (PS) modified polyphenylene oxide (PPO)blend )) and Valox 3150 resin (PBT) to make 4"×6"× 0.0625"plaques. A Nissei 160 ton press under the conditions shown in table 8 was used to make these samples.

TABLE 8

Conditions for In Mold Decorating Films with a Nissei 160 tons Injection Molding Machine.

| Resin | Barrel Set Temperatures | Tool Temperature |
|---|---|---|
| PBT (unpigmented) | Nozzle- 490 F.<br>Front- 490 F.<br>Middle- 490 F.<br>Rear- 490 F. | 170 F./170 F. |
| PC/PBT/MBS (Black) | Nozzle- 500 F.<br>Front- 500 F.<br>Middle- 500 F.<br>Rear- 475 F. | 150 F./150 F. |
| PPO/PS (Black) | Nozzle- 540 F.<br>Front- 540 F.<br>Middle- 540 F.<br>Rear- 525 F. | 160 F./160 F. |
| PC (Clear, unstabilized) | Nozzle- 555 F.<br>Front- 555 F.<br>Middle- 555 F.<br>Rear- 525 F. | 170 F./170 F. |

The laminate samples produced from this experiment were tested for chemical resistance, interlayer part adhesion and weatherability.

Chemical Resistance

The laminated plaque was tested for chemical resistance using a 50% Ethyl Acetate/50% Methanol mixture. The test was performed by placing a saturated piece of filter paper approximately 1" in diameter on the plaque (film side). The sample was then covered with a watch glass to prevent evaporation. After 5, 15, 30, 45 and 60 minutes the samples were checked for failure i.e. blistering or cracking. The table below shows the results of each laminated plaques performance.

TABLE 9

Results of Chemical Resistance Testing using a 50% Ethyl Acetate/50% Methanol Mixture

| Controls:<br>Material | Chemical Resistance |
|---|---|
| PC | Failed @ 5 min. |
| PPO/PS | Discolored @ 5 min |
| PC/PBT/MBS | Some Pitting @ 30 minutes |
| PBT | Pass @ 30 & 60 min |
| Laminated Samples | |
| 100% PCCD Film with UVA over: | |
| PC | Pass @ 30 & 60 min |
| PPO/PS | Pass @ 30 & 60 min |
| PC/PBT/MBS | Pass @ 30 & 60 min |
| PBT | Pass @ 30 & 60 min |
| 50/50 PC/PCCD Film with UVA over: | |
| PC | Pass @ 30 & 60 min (some discoloration) |
| PPO/PS | Pass @ 30 & 60 min |
| PC/PBT/MBS | Pass @ 30 & 60 min (some discoloration) |
| PBT | Pass @ 30 & 60 min |

Interlayer Adhesion Tests

An Instron 90 degree adhesion peel test was utilized to test the adhesion between the film and the injection molding resin. An area of the plaque was masked before in mold decorating to provide a tab to grab for the adhesion tests. One inch strips were cut from the center of each plaque. The samples was then mounted in the Instron and pulled apart at a rate of 0.016" per sec. The adhesion was reported in pounds per linear inch. The following table shows the results of these adhesion tests.

TABLE 10

Results of 90 Degree Adhesion Tests

| | Average Adhesion (lb/in) | Maximum Adhesion (lb/in) |
|---|---|---|
| 100% PCCD Film with UVA over: | | |
| PC* | 3.76 | 13.75 |
| PPO/PS | 0.35 | 1.00 |
| PC/PBT/MBS* | 7.30 | 32.63 |
| PBT | 0.76 | 1.62 |
| 50/50 PC/PCCD Film with UVA over: | | |
| PC* | 3.87 | 22.49 |
| PPO/PS | 0.40 | 1.46 |
| PC/PBT/MBS* | 18.11 | 35.90 |
| PBT | 0.51 | 1.29 |

*Last reported measurement before sample broke

Weatherability

The xenon arc accelerated testing was performed on a Ci35a xenon arc Weather-ometer® using a modified SAE J1960 protocol. The modification consisting of using a type S borosilicate filter as the inner and outer filters. The irradiance level was 0.77 W/m$^2$ at 340 nm, the black panel temperature was between 70–73° C., the dry bulb temperature was 45° C. with a wet bulb depression of 10° C. (50% relative humidity). The cycle was 160 min. light, 5 minutes dark, 15 minutes dark with water spray. This cycle accumulates 2.46 KJ/m$^2$ at 340 nm per hour of operation. Samples were exposed to 598.5 KJ/m$^2$ under these conditions.

The yellowness index (YI), haze and transmittance measurements were taken using a Gardner XL-835 calorimeter. Gloss measurements were also collected at a 60 degree angle on the irradiante/cycloaliphatic polyester side as per ASTM D523.

The results of these tests are shown in table 11.

TABLE 11

Weathering Results of Prepared Samples after 589.5 KJ/m2 Exposure in Xenon Arc

| Sample | Initial Gloss | 598.5 KJ/m2 Gloss | % Gloss Retention |
|---|---|---|---|
| PC/FBT/MBS Control | 98.5 | 0.9 | less than 1% |
| with PCCD laminate | 92.2 | 99.7 | 100% |
| with PC/PCCD laminate | 94.3 | 96.9 | 100% |
| PBT Control | 105.9 | 68.0 | 64% |
| with PCCD laminate | 88.0 | 91.0 | 100% |
| with PC/PCCD laminate | 104.5 | 95.2 | 91.1% |
| PPO/PS Control | 99.4 | 0.1 | less than 1% |
| with PCCD laminate | 89.3 | 89.8 | 100% |
| with PC/PCCD laminate | 93.5 | 96.9 | 100% |

| Sample | Change in YI (Final - Initial) |
|---|---|
| PC Control | 6.8 |
| with PCCD laminate | 4.3 |
| with PC/PCCD laminate | 3.6 |

Example 6.

A sheet was coextruded having a 70 wt. % PCCD/30 wt. % 130 grade PC blend cap layer and a 100% 100 grade PC substrate. The cap layer was 0.005 in. thick and the PC substrate was 0.095 in. thick. The resulting sheet was transparent and colorless. The layers showed excellent adhesion, good toughness and solvent resistance.

TABLE 12

Coextrusion Conditions for 70/30 PCCD/PC Cap Layer Over 100% PC Substrate.

| Main Extruder: | |
|---|---|
| Diameter | 1.25" |
| L/D | 24 |
| Barrel Temp (F.) | 470–490 |
| Residence Time (min) | 3–6 |
| Satellite Extruder: | |
| Diameter | 1.00" |
| L/D | 30 |
| Barrel Temp (F.) | 360 |
| Residence Time (min) | 15–20 |
| Line Speed (fpm) | 1.4 |

In a preferred embodiment of the invention a thin film of top layer material such as PCCD is coextruded with a thicker substrate material such as PC. The bottom of the polycarbonate layer is imprinted with an ink image. The decorative two layer composite is then placed in a mold and a layer of substrate material, in this case, the PC is injection molded to the printed side of what is now the layer of a four layer structure.

What is claimed:

1. A multilayer article which comprises a thermoplastic resin substrate layer and an adherent layer comprising a cycloaliphatic polyester on at least one surface of the substrate.

2. A multilayer article which comprises a substrate comprising a thermoplastic resin layer and an adherent layer comprising a cycloaliphatic polyester on at least one surface of the substrate wherein the cycloaliphatic polyester surface layer shows a 60 degree gloss change of less than or equal to 50% after 600 KJ/m2 exposure to a J1960 weathering test using borosilicate glass filtered xenon arc light.

3. A multilayer article which comprises a substrate comprising a thermoplastic resin layer and an adherent layer comprising a cycloaliphatic polyester on at least one surface of the substrate wherein the peel strength between the layers is greater than or equal to 5 lbs/in.

4. A multilayer article which comprises a substrate comprising a thermoplastic resin layer and an adherent layer comprising a cycloaliphatic polyester on at least one surface of the substrate where in the cycloaliphatic polyester surface of the article resists cracking or blistering after 60 minutes exposure to a 1:1 mixture of ethyl acetate and methanol.

5. An article according to claim 1 in which the thermoplastic resin substrate layer is a polycarbonate resin, an ABS resin, an ASA resin, a polyester, a polyphenylene ether or polyphenylene ether/polystyrene blend, or a blend comprising a polycarbonate resin with an ABS, ASA or aromatic polyester resin.

6. An article according to claim 5 in which the substrate layer is polycarbonate or a polycarbonate containing blend.

7. An article according to claim 6 in which the substrate layer blend comprises from about 15 to about 85 weight percent polycarbonate and from about 15 to about 85 weight percent ABS, ASA or polyester resin.

8. An article according to claim 1 in which the substrate layer further contains 1–50% of the cycloaliphatic polyester cap layer.

9. An article according to claim 1 where the adherent layer is a blend of polycarbonate with cycloaliphatic polyester.

10. An article according to claim 1 in which the adherent layer is a blend of polycarbonate and cycloaliphatic polyester derived from a cycloaliphatic diol and a cycloaliphatic diacid.

11. An article according to claim 1 in which the cycloaliphatic polyester is poly(1,4- cyclohexane dimethanol - 1,4- cyclohexanedicarboxylate).

12. An article according to claim 9 in which the amount of polycarbonate in the polycarbonate—cycloaliphatic poly ester blend of the adherent layer is from about 1 to about 50 percent by weight of the blend.

13. An article according to claim 9 which further comprises an acidic phosphorus quencher.

14. An article according to claim 13 wherein the acidic phosphorus quencher is chosen form the following group: phosphorous acid, phosphoric acid, acidic organo phosphates, and acidic organo phosphites.

15. An article of claim 1 wherein the substrate layer is a polycarbonate or a blend of polycarbonate with ABS, ASA or a polyester resin.

16. An article according to claim 9 in which the blend comprises polycarbonate, a cycloaliphatic polyester, and a UV absorber.

17. An article according to claim 16 in which the UV absorber is selected from the group consisting of 2-(benzotriazol-2-yl)-4-(1,1,3,3-tetramethylbutyl)phenol, 2-(benzotriazol-2-yl)-4-methylphenol, 2-hydroxy-4-octyloxy benzophenone, 2-hydroxy-4-methoxybenzophenone, ethyl-2,2-diphenyl-1-cyanoacrylate, 2'-ethylhexyl - 2, 2-diphenyl-1-cyanoacrylate, 2-(2'-hydroxy-4'-octyloxy) bis-4,6-(2', 4'-dimethylphenyl) triazine, 2-ethyl- 2'- ethoxy oxalanide, bis [2-hydroxy-5-methyl-3- (benzotriazol-2-yl) phenyl ] -methane, bis[2- hydroxy- 5-t - octyl -3- ( benzotriazol -2-yl) phenyl] methane, 2,2'- (1,4- phenylene ) bis [ 4 H - 3, 1-benzoxazin -4-one], and 2- ( 2'- hydroxy) -4,6- diphenyltriazine.

18. An article according to claim 16 in which the UV absorber is a benzotriazole, a benzophenone, a triazine, a cyanoacrylate, a dibenzoylresorcinol, or an oxanilide.

19. An article according to claim 16 in which the UV absorber is a dibenzoylresorcinol.

20. An article according to claim 19 in which the dibenzoyl rescorcinol is 4,6-dibenzoylresorcinol, bis(2,6-dihydroxy-3,5-dibenzoylphenyl)methane, or 2-(3-triethoxysilyl propyl)-4,6-dibenzoyl resorcinol.

21. A multilayer plastic article according to claim 1 comprising an intermediate decorative layer between the substrate and the cycloaliphatic polyester layer.

22. An article according to claim 21 which the intermediate decorative layer is printed on at least a portion of at least one surface of the cycloaliphatic polyester layer between the intermediate layer and the cycloaliphatic polyester layer.

23. An article according to claim 1 comprising a thermoplastic resin substrate layer, a first film of the same thermoplastic resin substrate bonded to at least one surface of the substrate layer, and a second film comprising a cycloaliphatic polyester bonded to a surface of the first film opposite the surface bonded to at least one surface of the substrate layer.

24. An article according to claim 23 comprising a polycarbonate substrate, a polycarbonate film bonded to at least one surface of the substrate, a cycloaliphatic polyester surface film bonded to the outer surface of the polycarbonate film.

25. An article according to claim 24 in which the surface film is a blend of polycarbonate and a cycloaliphatic polyester.

26. An article according to claim 25 in which the cycloaliphatic polyester is PCCD.

27. An article of claim 5 wherein the polycarbonate -aromatic polyester substrate further contains a rubbery impact modifier.

28. An article of claim 27 wherein the rubbery substrate is chosen from the group consisting of MBS, Acrylic rubber, ASA or ABS rubbers.

29. An article of claim 1 made by a blow molding, sheet, film or profile extrusion, in mold decoration or injection molding process.

30. An article of claim 29, made by coextruding the substrate layer material and the top layer material, decorating the bottom surface of the substrate layer, and injection or blow molding another layer of substrate material to the decorative surface of the substrate.

31. A multilayer article comprising a substrate comprising a thermoplastic resin layer and an adherent layer comprising a cycloaliphatic polyester on at least one surface of the substrate wherein the polyester layer has a tear strength of 69 grams/mil.

* * * * *